United States Patent
Hansen

(10) Patent No.: US 7,020,220 B2
(45) Date of Patent: Mar. 28, 2006

(54) DIGITAL ESTIMATION AND CORRECTION OF I/Q MISMATCH IN DIRECT CONVERSION RECEIVERS

(75) Inventor: Christopher James Hansen, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 697 days.

(21) Appl. No.: 10/172,978

(22) Filed: Jun. 18, 2002

(65) Prior Publication Data

US 2003/0231723 A1    Dec. 18, 2003

(51) Int. Cl.
*H04L 27/14* (2006.01)
*H04L 27/16* (2006.01)

(52) U.S. Cl. .................................................. 375/324
(58) Field of Classification Search .......... 455/313–15, 455/317–18, 323–24, 334, 337–34, 255–65, 455/296, 115, 307–12; 375/261, 298, 295, 375/349, 316, 343
See application file for complete search history.

(56) References Cited

U.S. PATENT DOCUMENTS

| | | | | |
|---|---|---|---|---|
| 6,009,317 A | * | 12/1999 | Wynn | 455/296 |
| 6,330,290 B1 | * | 12/2001 | Glas | 375/324 |
| 2002/0097812 A1 | * | 7/2002 | Wiss | 375/316 |
| 2003/0206603 A1 | * | 11/2003 | Husted | 375/324 |

* cited by examiner

*Primary Examiner*—Jay K. Patel
*Assistant Examiner*—Sophia Vlahos
(74) *Attorney, Agent, or Firm*—Sterne, Kessler, Goldstein & Fox P.L.L.C.

(57) ABSTRACT

An IQ receiver includes an estimator/compensator module to determine and correct IQ mismatch errors between the I and Q channels of the IQ receiver. The estimator module determines a phase compensation factor $C_1$ and an amplitude compensation factor $C_2$ based on a calibration signal that is injected into the analog front-end of the IQ receiver. A compensator module applies the phase correction factor $C_1$ and the amplitude correction factor $C_2$ to the baseband output of the Q channel in order to reduce any phase or amplitude errors between the I and Q channels. The estimator module and the compensator module can be efficiently implemented in a digital state machine, or processor, including a digital signal processor.

21 Claims, 13 Drawing Sheets

DIGITAL ESTIMATION AND CORRECTION OF I/Q MISMATCH IN DIRECT CONVERSION RECEIVERS

BACKGROUND OF THE INVENTION

1. Field of the Invention

The present invention generally relates to an in-phase (I) and quadrature (Q) receiver, and more specifically to an apparatus and method for compensating for IQ mismatch errors between the I and Q channels in an IQ receiver.

2. Background Art

Wireless communications systems often transmit data using an in-phase (I) and quadrature (Q) format. The I and Q channels in an IQ signal are phased-shifted relative to each other by 90 degrees, which is known as a quadrature relationship. The IQ format is popular for data transmissions because an IQ signal is capable of carrying two data streams in the frequency bandwidth that is normally required by a single data stream. In other words, the IQ format allows twice the data to be sent over a given frequency bandwidth. At the radio receiver, the I and Q channels are typically down-converted and demodulated to recover the I and Q channel data.

The IQ radio receiver typically includes separate receiver paths for the I channel and the Q channel. For instance, the I channel receiver path can include a first set of mixers, amplifiers, filters, etc. to down-convert and process the I channel data. Likewise, the Q channel receiver path can include a second set of mixers, amplifiers, filters, etc. to down-convert and process the Q channel data.

I/Q mismatch error in the radio receiver can impair the ability to successfully receive and process high speed data carried by the wireless signal. I/Q mismatch errors occur when the I channel gain is different from that of the Q channel, or when the phase relationship between the two channels is not exactly 90 degrees. I/Q mismatch error is caused by gain and/or phase mismatches of the high frequency components in the I and Q channels of the I/Q receiver. For example, the receiver components in the I channel can have slightly different amplitude and/or phase characteristics than the receiver components in the Q channel, introducing mismatch errors in the I and Q baseband signals. Although the differences are usually small, these gain and phase mismatches reduce the effective signal-to-noise ratio of the IQ receiver, and increase the number of bit errors for a given data rate.

One conventional solution to reduce the effect of I/Q mismatch errors is to utilize highly precise components in the I and Q channels that have matching amplitude and phase characteristics. These high quality components may be too expensive for low cost applications, such as wireless local area network applications, or other low cost consumer applications.

Another conventional solution is to purchase lower precision components, but to test and characterizes the components so that components with matching amplitude and phase characteristics can be put in the same IQ receiver. Although effective, this solution is time consuming, and labor intensive because a technician must test and characterize each and every component. Therefore, this solution can be as costly as buying high precision components.

What is needed is an I/Q receiver that includes a means for detecting and correcting for I/Q mismatch error in real time, without resorting to high precision components or component characterization.

BRIEF SUMMARY OF THE INVENTION

The present invention includes a method and apparatus for correcting mismatch errors between the I and Q channels in an IQ receiver. The IQ mismatch is corrected by applying a phase correction factor $C_1$ and an amplitude correction factor $C_2$ to the Q baseband signal. The phase correction factor $C_1$ and the amplitude correction factor $C_2$ are determined based on a calibration signal that is injected into the analog front-end of the IQ receiver.

More specifically, a calibration signal is injected into the IQ receiver input, to produce an $I_N$ baseband signal and a $Q_N$ baseband signal at the output of the IQ receiver. The calibration signal can be a known signal source, or it can be noise that is generated by the IQ receiver when no input signal is received. An average power $P_I$ is determined for the $I_N$ baseband signal, and an average power $P_Q$ is determined for the $Q_N$ baseband signal. A cross-correlation $R_{IQ}$ is determined between the $I_N$ baseband signal and the $Q_N$ baseband signal. A phase compensation factor $C_1$ is determined based on the average power $P_I$ and the cross-correlation $R_{IQ}$, where the phase compensation factor $C_1$ is determined to compensate for any phase error between the $I_N$ baseband signal and the $Q_N$ baseband signal. An amplitude compensation factor $C_2$ is determined based on the average power $P_I$, the average power $P_Q$, and the cross-correlation $R_{IQ}$, where $C_2$ is determined to compensate for any amplitude error between the $I_N$ baseband signal and the $Q_N$ baseband signal.

In one embodiment, an estimator module determines the phase compensation factor $C_1$ and the amplitude compensation factor $C_2$ according to the following equations, $$C_1 = \frac{R_{IQ}}{P_I}, \text{ and}$$

$$C_2 = \left[\frac{1}{P_I}\sqrt{P_I P_Q - R_{IQ}^2}\right]^{-1}.$$

The equations for $C_1$ and $C_2$ can be efficiently implemented in a digital state machine, or processor, including a digital signal processor (DSP). Once the compensation factors $C_1$ and $C_2$ are determined, the calibration signal is disengaged, and the IQ receiver can receive information bearing signals. A compensator module applies the phase compensation factor $C_1$ and the amplitude compensation factor $C_2$ to an information bearing Q baseband signal to correct any phase or amplitude errors between the information I baseband signal and the information bearing Q baseband signal.

The advantage of the present invention is that the calibration can be accomplished with noise that is self-generated by the I/Q receiver. The IQ mismatch for noise is the same as the IQ mismatch for a desired input signal. Furthermore, the phase and amplitude compensation can be determined and applied using low cost digital hardware, such as a digital state machine, a processor, and/or DSP. This enables IQ compensation in low-cost transceiver applications, such as wireless LAN applications.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

1. IQ Receiver

Figure 1:
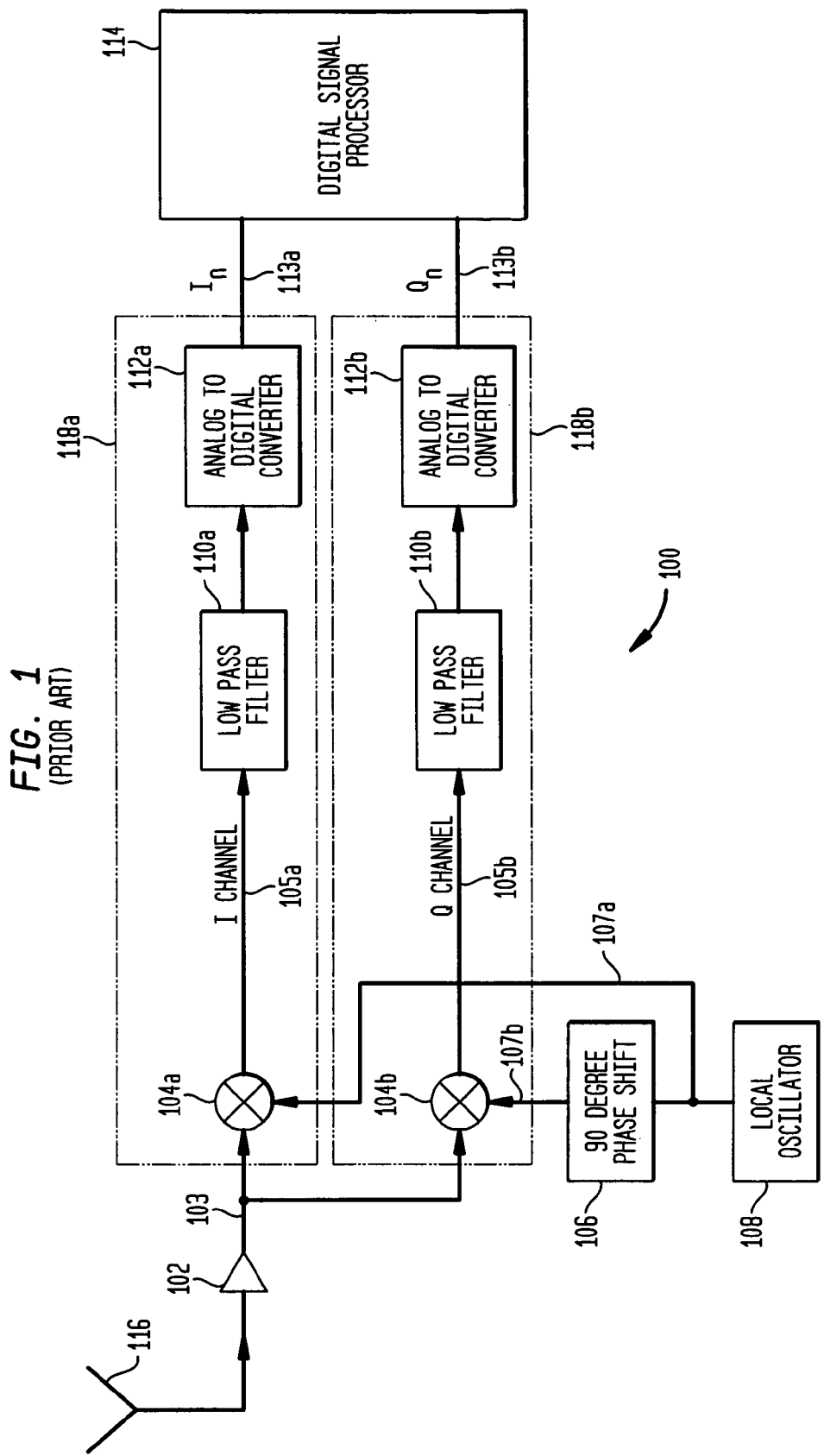
FIG. 1 illustrates a conventional IQ receiver.

FIG. 1 illustrates a conventional direct conversion IQ receiver 100 having an antennal 116, an amplifier 102, an I-channel path 118a, a Q channel path 118b, and a digital signal processor 114. The IQ receiver 100 receives an IQ signal at the antenna 116, and directly down-converts the IQ signal to baseband, to produce I channel data 113a and Q channel data 113b.

During operation, the antenna 116 receives an IQ signal over the air. The IQ signal carries I channel data and Q channel data in the same frequency bandwidth that would normally be needed for a single data stream. The I channel data and the Q channel data can be two distinct data streams, or the I and Q channels can be interleaved to create a single data stream that occupies only half the normal bandwidth (needed without the IQ format.) The IQ signal received by the antenna 116 can be carried on a radio frequency (RF) carrier, or some other high frequency carrier suitable for over-the-air transmission. For instance, the IQ signal can be a terrestrial or satellite television (TV) signal, or some other type of communications signal, including a data communications signal.

The antenna 116 can be replaced with a cable, such as that used in a cable TV system, or some other type of communications system.

The amplifier 102 receives the output of the antenna 116 and generates an amplified IQ signal 103 that is delivered to both the I-channel path 118a and the Q channel path 118b. The I channel path 118a and the Q channel path 118b are arranged in-parallel such that the IQ signal 103 can be processed in parallel. The I channel path 118a down-converts and digitizes the IQ signal 103, to produce an I baseband signal 113a. Similarly, the Q channel 118b down-converts and digitizes the IQ signal 103, to produce an Q baseband signal 113b.

The I channel path includes a mixer 104a, a low pass filter 110a, and an analog-to-digital converter (ADC) 112a. In the I channel path, the mixer 104a mixers the IQ signal 103 with a local oscillator signal 107a from the local oscillator 108. The frequency of the local oscillator signal 107a is chosen to directly down-convert the IQ signal 103 to baseband, producing the baseband signal 105a. In other words, the frequency of the local oscillator 108 is selected so as to be substantially equal to the frequency of the IQ signal 103. The I channel baseband signal 105a is low pass filtered by the filter 110a, where the passband of the filter 110a is determined so as to substantially pass the I baseband signal 105a and reject all other frequencies. The ADC 112a digitizes the output of the lowpass filter 110a, to generate the I baseband signal 113a.

Likewise, the Q channel path includes a mixer 104b, a lowpass filter 110b, and an analog-to-digital converter (ADC) 112b. In the Q channel path, the mixer 104a mixes the IQ signal 103 with a local oscillator signal 107b, which is phased-shifted by 90 degrees relative to the local oscillator signal 107a by the 90 degree phase shifter 106. The resulting Q channel baseband signal 105b is low pass filtered by the filter 110b, where the passband of the filter 110b is determined so as to substantially pass the Q baseband signal 105b and reject all other frequencies. The ADC 112a digitizes the output of the lowpass filter 110b, to generate the Q baseband signal 113b.

The digital signal processor (DSP) 114 receives the I and Q baseband signals 113a and 113b, and demodulates the I and Q baseband signals 113 to process and retrieve the baseband information.

Any gain or phase mismatches between the I path 118a and the Q path 118b can reduce the overall signal-to-noise ratio of the IQ receiver 100, and increase the bit error rate of the IQ receiver 100. For instance, if the mixer 104a has a different amplitude and/or phase characteristic than the mixer 104b, the differences will increase the bit error rate in the resulting I and Q baseband signals during demodulation. This also holds for any gain or phase mismatches between the filters 110a and 110b, or the ADCs 112a and 112b.

As stated above, FIG. 1 illustrates a direct conversion receiver, where the input signal received by the antenna 116 is down-converted directly to baseband by a single mixer stage. In contrast, a dual-conversion (or super-heterodyne) receiver configuration includes multiple mixer stages to down-convert the input signal to baseband, and therefore the input signal is down-converted to an intermediate (IF) frequency before being down-converted to baseband. As a result, the individual frequency translations (in Hz) performed by a dual conversion receiver are typically smaller than the frequency translation performed in a direct conversion receiver. For example, given an input frequency of 1 Ghz, a direct conversion receiver translates this input signal directly to baseband, so as to produce a frequency shift of approximately 1 Ghz (assuming a DC baseband signal). Whereas, a dual conversion receiver translates the input signal to an IF frequency, e.g. 275 Mhz, and then to baseband.

Despite the shorter frequency translations, I/Q mismatch error is also detrimental for dual conversion receivers, as it produces the same reduction in signal-to-noise ratio and the corresponding increase in bit error rate. However, the I/Q mismatch error is usually more detrimental in direct conversion receivers than in dual-conversion receivers because of the increased frequency translation, and the overall higher frequency of operation.

2. I/Q Mismatch

Figure 2A:
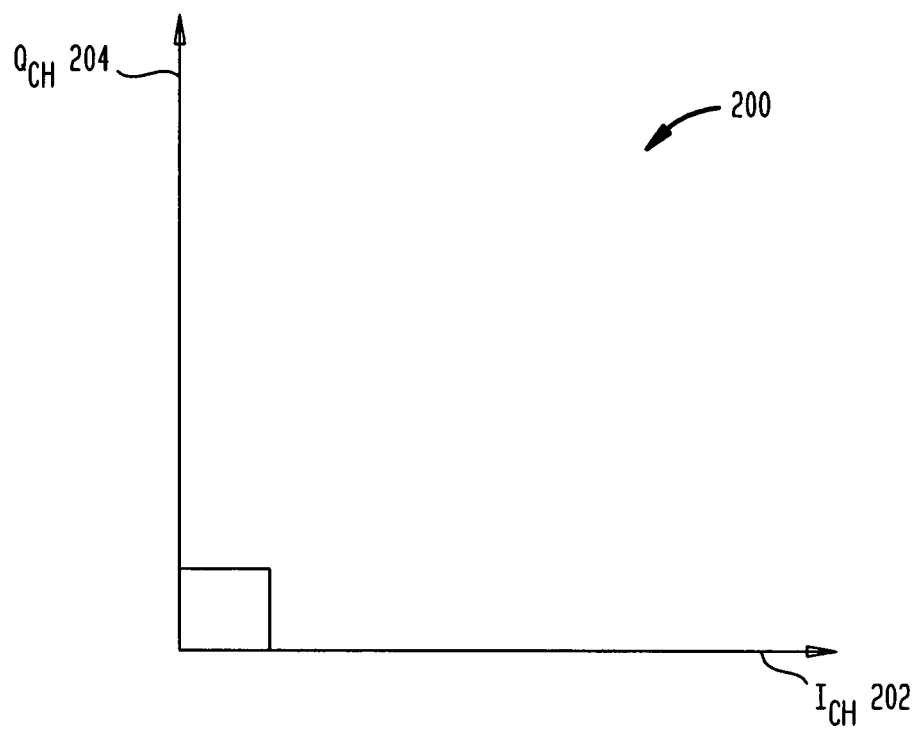
FIG. 2a illustrates an ideal IQ channel relationship in an IQ receiver.
Figure 2B:
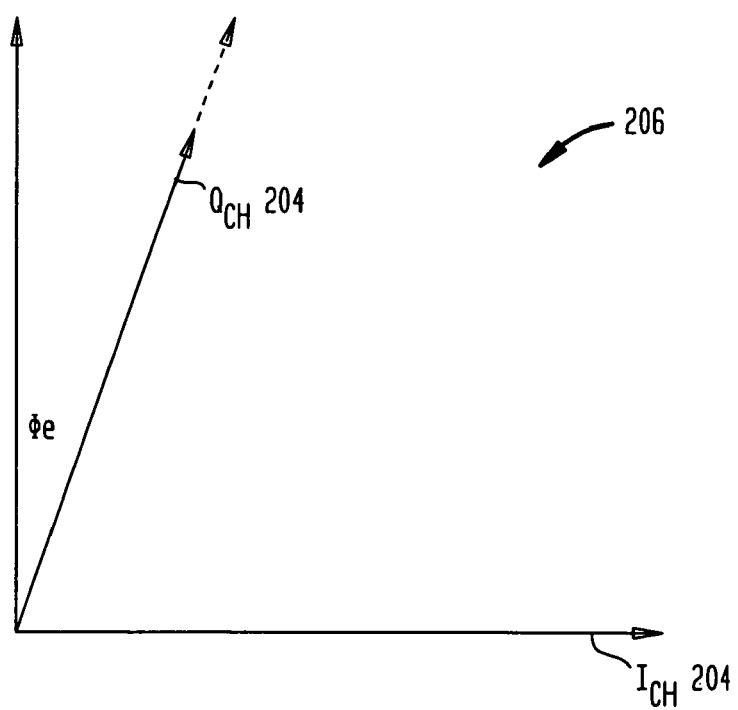
FIG. 2b illustrates a non-ideal IQ channel relationship in an IQ receiver.

FIGS. 2a and 2b compare an ideal I/Q channel with an non-ideal I/Q channel to further illustrate I/Q mismatch. FIG. 2A illustrates an ideal I/Q channel 200 having an I channel 202 and a Q channel 204. The I channel 202 has an equal amplitude with a Q channel 204. Furthermore, the Q channel 204 is phase shifted by exactly 90 degrees relative to the I channel 204. As a result, the I and Q channels have an ideal ortho-normal relationship. FIG. 2b illustrates a non-ideal I/Q channel 206. The amplitude of the Q channel 204 is smaller than the amplitude of the I channel 202, as represented by the dotted line. Furthermore, the Q channel 204 does not have a perfect quadrature relationship with the I the channel 202. In other words, the Q channel 204 is phase shifted by some amount less 90 degrees relative to the I channel 202, and indicated by the angle $\phi_e$. The amplitude and phase errors that are evident in the non-ideal I/Q channel 206 will lead to more bit errors for a given data rate compared to the ideal I/Q channel 200. Therefore, it desirable to reduce or eliminate the amplitude and phase errors between the I and Q channels so as to maximize the rate of data transmission.

3. I/Q Mismatch Compensation

The present invention includes an estimator and a compensator to correct I/Q mismatch errors in an I/Q receiver. The estimator determines the I/Q mismatch error between the I and Q channels of an I/Q receiver based on a calibration signal that is injected into the I/Q receiver, and determines correction factors based on the mismatch error. The compensator applies the correction factors to the baseband I and Q signals to correct the I/Q mismatch error.

Figure 3:
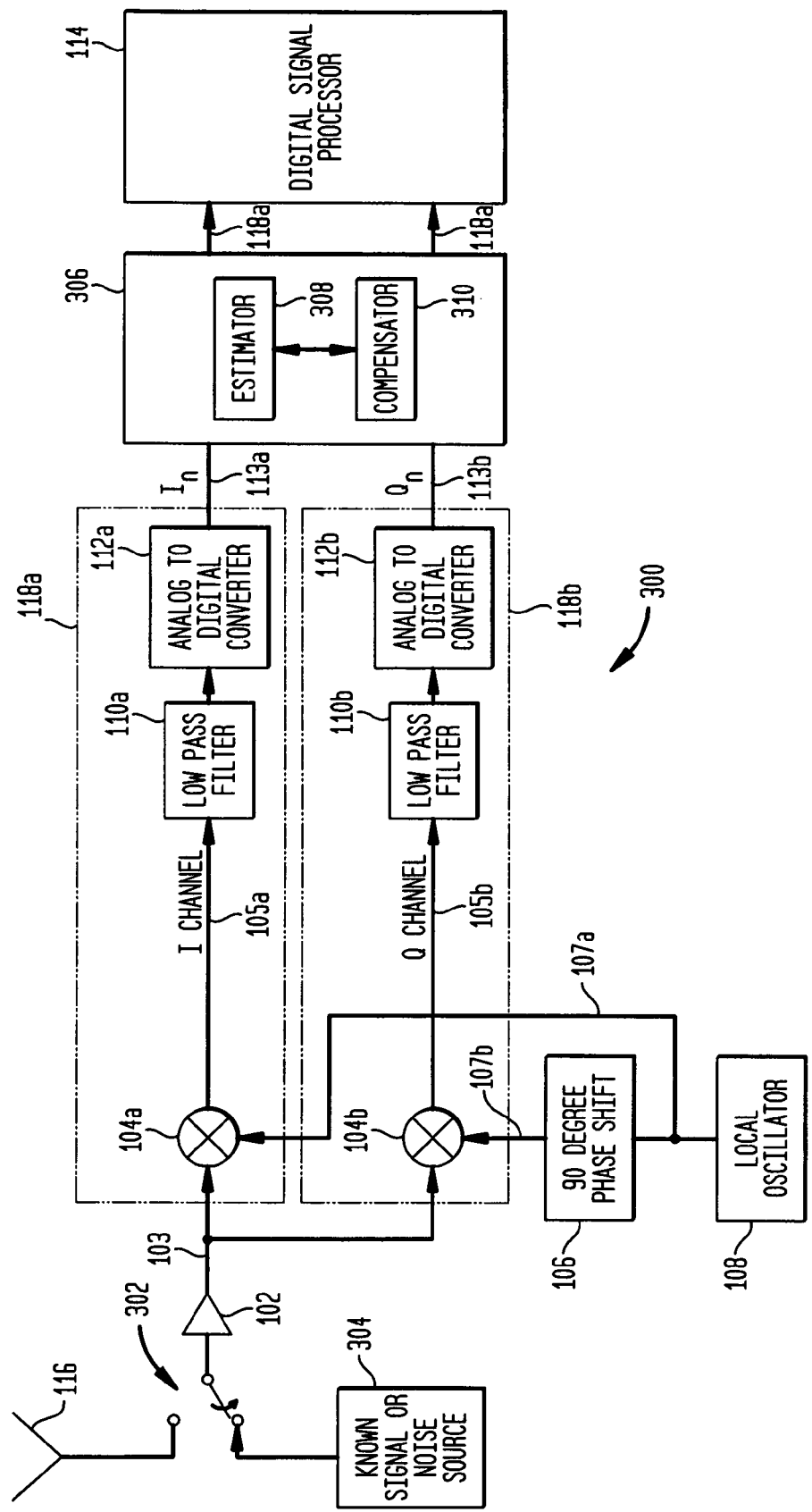
FIG. 3 illustrates an IQ receiver that performs IQ mismatch estimation and compensation according to embodiments of the invention.
Figure 4:
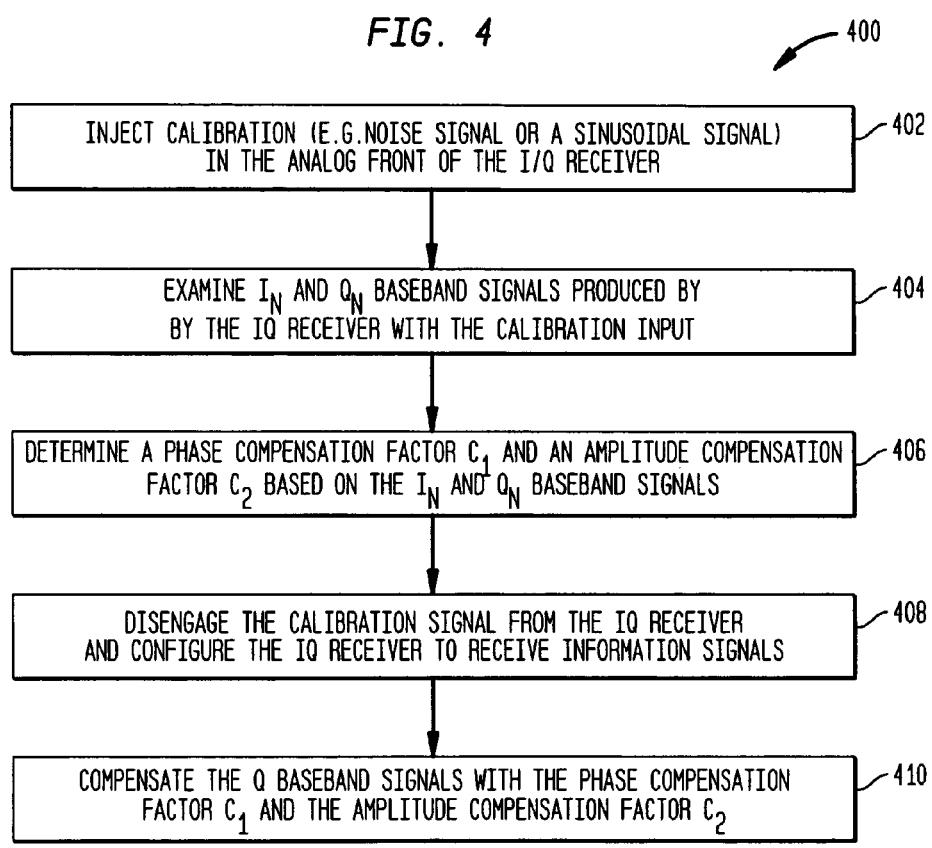
FIG. 4 illustrates an operational flowchart for estimating and compensating IQ mismatch in an IQ receiver.

FIG. 3 illustrates an IQ receiver 300 that performs IQ mismatch estimation and compensation according to embodiments of the invention. The IQ receiver 300 is similar to the IQ receiver 100, but includes a switch 302, a signal source 304, and an estimator/compensator module 306. The estimator/compensator module 306 includes an estimator module 308 and a compensator module 310. The IQ mismatch errors are estimated by injecting a calibration signal into the I/Q receiver 300, and then determining correction factors ($C_1$ and $C_2$) to compensate for the amplitude and phase mismatch errors based on the calibration signal. The operation of the IQ Receiver 300 is further described in reference to the flowchart 400, and is discussed below.

In step 402, a calibration signal is injected into the analog front-end of the I/Q receiver. The analog front-end is generally defined as that part of the receiver prior to baseband down-conversion. Referring to FIG. 3, the analog front-end includes the LNA 102 and the mixers 104, and the rest of the receiver 300 would describe the baseband operation. The calibration signal can be input noise picked up by the antenna 116 and/or noise generated by components in the receiver 300, when no (deliberate) signal is being received.

In other words, the calibration signal can be background noise that is picked-up or generated by the receiver 300. Alternatively, the calibration signal can be deliberately injected into the analog front-end of the receiver 300. For example, the known signal source 304 can inject a known calibration signal directly into the LNA 102 by configuring the switch 302. The known signal source 304 can be a sinusoidal signal source, a noise source, or some other type of known signal source. The signal-to-noise ratio of the LNA 102 should dominate the overall signal-to-noise ratio of the receiver 100. Furthermore, the I/Q mismatch should be the same for both the desired information bearing signals and noise that is injected int the IQ receiver 100.

In step 404, the estimator/compensation module 306 examines the $I_N$ and $Q_N$ baseband signals that are produced when the calibration signal is injected into the analog front-end. Herein, I and Q baseband signals that are generated from the calibration input are given the subscript "$_N$" (e.g. "$I_N$" and "$Q_N$") to distinguish them from I and Q baseband signals carrying information. For example, the baseband signals $I_N$ 113a and $Q_N$ 113b can be examined with the known source 304 connected to the LNA 102.

In step 406, the estimator 308 determines a phase compensation factor $C_1$ and an amplitude compensation factor $C_2$ from the $I_N$ and $Q_N$ baseband signals 113. The phase compensation factor $C_1$ corrects for any phase error between the I and Q channels 118a and 118b. Whereas, the amplitude compensation factor $C_2$ corrects for any amplitude error between the I and Q channels 118a and 118b.

In step 408, the calibration signal is disengaged from the I/Q receiver 300, and the I/Q receiver 300 is configured to receive the analog information signals. For example, the switch 302 is configured to connect the antenna 116 to the LNA 102 instead of to the signal source 304, thereby generating I and Q baseband signals 113 that carry useful information.

In step 410, the compensator 310 compensates the Q baseband signals with the phase compensation factor $C_1$ and the amplitude compensation factor $C_2$, to produce compensated baseband signals I and Q signals 118a and 118b. The phase compensation factor $C_1$ adjusts the Q baseband signal 118b to correct for any phase error between the I and Q baseband signals. The amplitude compensation factor $C_2$ adjusts the Q baseband signal 118b to correct for any amplitude error between the I and Q baseband signals. The compensated baseband signals 118a and 118b are then forwarded to the DSP 114 for further processing.

Figure 5:
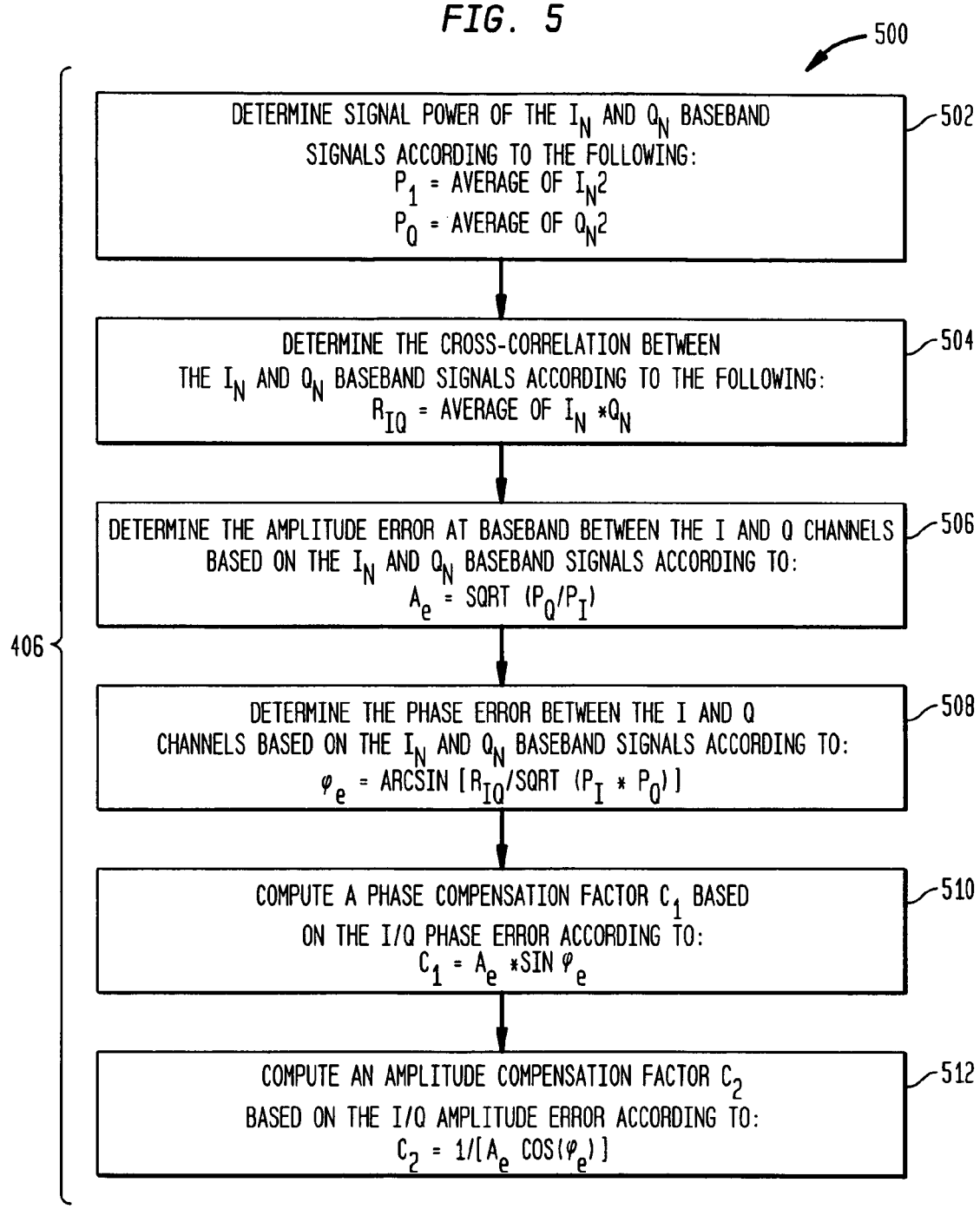
FIG. 5 further describes an operational flowchart for estimating IQ mismatch error in an IQ receiver based on a calibration signal injected into the IQ receiver.

The determination of the phase compensation factor $C_1$ and the amplitude compensation factor $C_2$ (step 406) are further described in flowchart 500 that is shown in FIG. 5. In step 502, the signal power of the $I_N$ and $Q_N$ baseband signals is determined according the following equations:

$$P_I = \text{Average of } I_N^2 \qquad \text{Eq. 1}$$

$$P_Q = \text{Average of } Q_N^2 \qquad \text{Eq. 2}$$

where $I_N$ and $Q_N$ are the vector I and Q baseband signals with the calibration signal injected into the analog front-end.

In step 504, the cross correlation is determined between the I and Q baseband signals according to the following equation:

$$R_{IQ} = \text{Average of } I_N \cdot Q_N \qquad \text{Eq. 3}$$

Cross-correlation is a measure of the quadrature relationship between the I and Q channels. If the I and Q channels are in perfect quadrature, then the result of the vector multiplication in Eq. 3 would be zero, and the cross-correlation would also be zero. If the phase difference between the I and Q channels deviates from 90 degrees, then the cross-correlation will deviate from 0.

In step 506, the amplitude error between the $I_N$ and $Q_N$ baseband signals is determined based on the parameters determined in step 502. The amplitude error is determined according to the following equation:

$$A_e = SQRT(P_Q/P_I). \quad \text{Eq. 4}$$

In an ideal I/Q receiver, the I and Q baseband signals would have equal amplitude so that $P_Q$ would equal $P_I$. However, in a non-ideal I/Q receiver, $P_I$ can differ from $P_Q$ because of additional losses or gains in one channel verses another channel.

In step 508, the phase error between the $I_N$ and $Q_N$ baseband signals is determined based on the parameters determined in step 502. Referring back to FIG. 2b, the phase difference between the $I_N$ and $Q_N$ channels represents the deviation of the Q channel from the desired 90 degree phase shift relative to the I channel. The phase error is determined according to the following equation:

$$\phi_e = \arcsin[R_{IQ}/SQRT(P_I P_Q)]. \quad \text{Eq. 5}$$

For an ideal I/Q channel, the phase error will be 0 degrees. Any deviation from 0 degrees, is a phase error.

In step 510, a phase compensation factor $C_1$ is determined based on the amplitude error and the phase error determined in steps 504 and 506. More specifically, the phase compensation factor is determined based on the following equation:

$$C_1 = A_e \cdot \sin \phi_e \quad \text{Eq. 6}$$

In step 512, an amplitude compensation factor is determined based on the amplitude error and the phase error determined in steps 504 and 506. More specifically, the amplitude compensation factor is determined based on the following equation:

$$C_2 = 1/[A_e \cdot \cos(\phi_e)] \quad \text{Eq. 7}$$

4. Efficient Calculation of $C_1$ and $C_2$

The phase and amplitude compensation factors $C_1$ and $C_2$ can be re-arranged for efficient calculation of these factors in a digital state machine, digital signal processor, or another type of processor. For instance, repeating equation 6, $$C_1 = A_e \sin \phi_e \quad \text{Eq. 6}$$

where $\phi_e = \arcsin[R_{IQ}/SQRT(P_I P_Q)]$, and $A_e = SQRT(P_Q/P_I)$. By substitution, $$C_1 = \sqrt{\frac{P_Q}{P_I}} \sin\left[\text{Arc Sin}\left(\frac{R_{IQ}}{\sqrt{P_I P_Q}}\right)\right]; \quad \text{Eq. 8}$$

$$= \sqrt{\frac{P_Q}{P_I}} \cdot \frac{R_{IQ}}{\sqrt{P_I P_Q}}; \quad \text{Eq. 9}$$

$$C_1 = \frac{R_{IQ}}{P_I} \quad \text{Eq. 10}$$

Therefore, $C_1$ can be determined based on the ratio of the cross correlation factor $R_{IQ}$ and the in-phase power $P_I$.

Similarly, $C_2$ can be re-arranged as follows:

$$C_2 = [A_e \cos \phi_e] \text{ Substituting for } \phi_e \text{ and } A_e;$$

$$C_2 = \left[\sqrt{\frac{P_Q}{P_I}} \cos\left(\text{Arc Sin}\left[\frac{R_{IQ}}{\sqrt{P_I P_Q}}\right]\right)\right]^{-1}; \quad \text{Eq. 11}$$

$$C_2 = \left[\sqrt{\frac{P_Q}{P_I}} \cos\left(\text{Arc Sin}\left[\frac{R_{IQ}}{\sqrt{P_I P_Q}}\right]\right)\right]^{-1}. \quad \text{Eq. 12}$$

Via trigometric identity, $$\cos(\text{Arc Sin } X) = \sqrt{1 - x^e};$$

Applying the trigometric identity to equation 12:

$$C_2 = \left[\sqrt{\frac{P_Q}{P_I}} \cdot \sqrt{1 - \frac{R_{IQ}^2}{P_I P_Q}}\right]^{-1}; \quad \text{Eq. 13}$$

Simplifying, $$C_2 = \left[\sqrt{\frac{P_Q}{P_I} - \frac{R_{IQ}^2}{P_I}}\right]^{-1}; \quad \text{Eq. 14}$$

And simplifying further, $$C_2 = \left[\frac{1}{P_I} \sqrt{P_I P_Q - R_{IQ}^2}\right]^{-1}. \quad \text{Eq. 15}$$

Therefore, $C_2$ can be determined based on $P_I$, $P_Q$, and $R_{IQ}$. As will be shown, equations 10 and 15 can be efficiently implemented to determine $C_1$ and $C_2$ in a digital state machine circuit that is configured using digital circuits, or a DSP. The cost of a digital signal processors (DSP) has been sufficiently reduced to make digital compensation of IQ mismatch economical.

Figure 6:
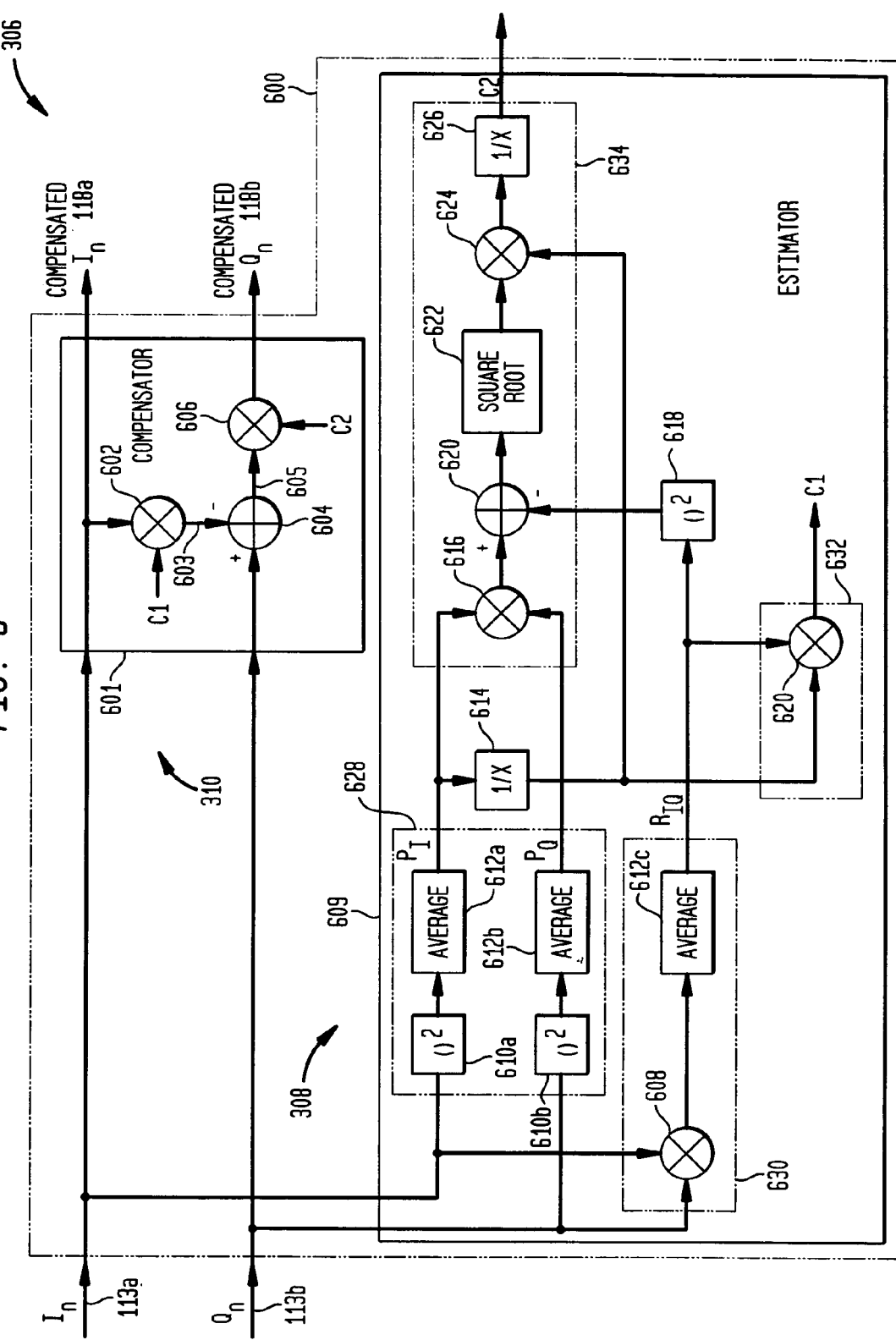
FIG. 6 further illustrates an estimator/compensator apparatus that efficiently estimates IQ mismatch error based on the calibration signal.
Figure 7:
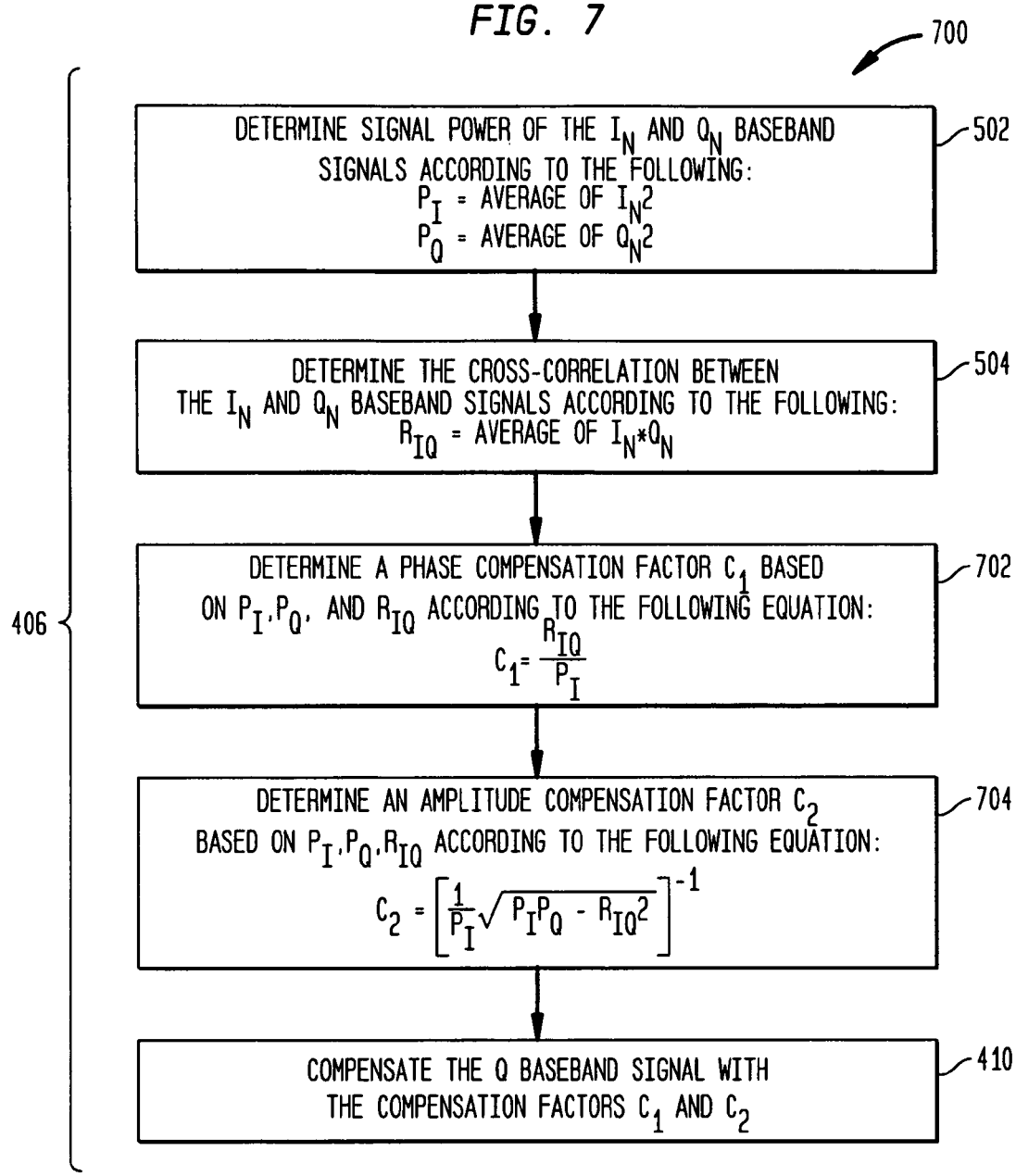
FIG. 7 illustrates an operational flowchart of one embodiment for efficiently estimating IQ mismatch error based on the calibration signal.

FIG. 6 illustrates an estimator/compensator module 600 that is one implementation of the estimator/compensator module 306. The estimator/compensator module 600 is an efficient implementation of the estimator compensation module 306, and can be implemented in a state machine, DSP, or other type of processor. The estimator/compensation 600 module includes an estimator module 609 and a compensator module 601. The estimator module 609 determines the phase compensation factor $C_1$ and the amplitude compensation factor $C_2$, according to the equations 10 and 15 above. The estimator module 609 sends the phase compensator factor $C_1$ and the amplitude compensator factor $C_2$ to a compensator module 601, for compensation of information baring I and Q baseband signals. The estimator module 609 and the compensator module 601 are described further as follows and in reference to the flowchart 700, which repeats some steps of the flowcharts 400 and 500.

In step 502, a power detector module 628 determines baseband power parameters for the $I_N$ and $Q_N$ baseband signals 113. More specifically, squaring modules 610a and 610b respectively receive $I_N$ and $Q_N$ baseband signals 113a and 113b that are generated from an injected calibration signal. The squaring module 610a squares the $I_N$ baseband signal 113a, and the squaring module 610b squares the $Q_N$ baseband signal 113b. Average modules 612a and 612b respectively receives the output of the squaring modules 610a and 610b. The average module 612a averages the output of the squaring modules 610a, to produce an average power $P_I$ for the $I_N$ baseband signal 113a. A reciprocal module 614 also determines the reciprocal of $P_I$, which is $1/P_I$, for later use. The average module 612b averages the output of the squaring modules 610b, to produce an average power $P_Q$ for the $Q_N$ baseband signal 113b.

In step 504, a cross-correlation module 630 determines the cross-correlation parameter between the $I_N$ and $Q_N$ baseband signals 113. More specifically, the multiplier 608 receives the $I_N$ and $Q_N$ baseband signals 113 and multiples these signals together to form $I_N \cdot Q_N$. The averaging module 612c determines the average of $I_N \cdot Q_N$ to generate the cross-correlation factor $R_{IQ}$. The cross-correlation factor $R_{IQ}$ is a measure of the quadrature relationship between the I and Q channels. If the I and Q channels are in perfect quadrature, then the result of the vector multiplication in Eq. 3 would be zero, and the cross-correlation would also be zero. If the phase difference between the I and Q channels deviates from 90 degrees, then the cross-correlation will deviate from 0. A squaring module 618 receives the cross-correlation factor $R_{IQ}$, and squares the cross-correlation factor to generate $R^{IQ2}$ for determination of the amplitude compensation factor $C_2$.

In step 702, a phase compensator module 632 determines the phase compensation factor $C_1$ according to the equation 10 above. More specifically, a multiplier 620 in the phase compensator module 632 receives $1/P_I$ from the reciprocal module 614 and receives $R_{IQ}$ from the cross-correlation module 630. The multiplier 620 multiples the cross-correlation factor $R_{IQ}$ by the $1/P_I$ factor from the reciprocal module 614 to generate the $R_{IQ}/P_I$, which is the phase compensation factor $C_1$.

Figure 10:
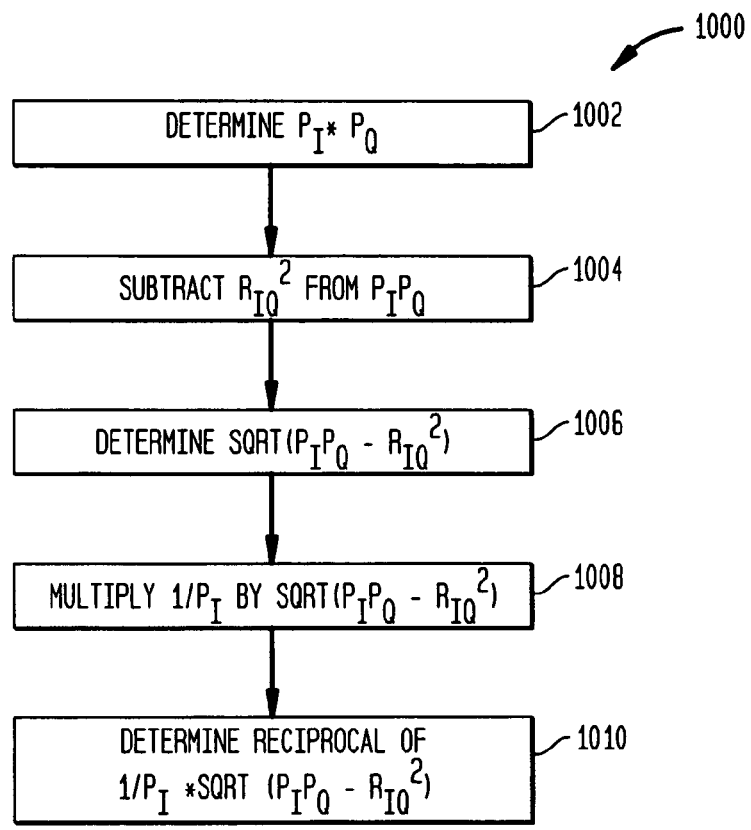
FIG. 10 illustrates an operational flowchart for efficiently determining the amplitude compensation factor according to embodiments of the present invention.

In step 704, an amplitude compensator module 634 determines the amplitude compensation factor $C_2$ according to the equation 15 above. The step 506 is further described by the flowchart 1000 (FIG. 10) as follows. In step 1002, a multiplier 616 multiplies the average powers $P_I$ and $P_Q$ together to form the factor $P_I P_Q$ per equation 15. In step 1004, a subtractor module 620 receives the $P_I P_Q$ factor from the multiplier 616 and receives the $R_{IQ}^2$ factor from the squarer module 618. The subtractor module 620 subtracts the $R_{IQ}^2$ factor from $P_I P_Q$ factor to generate $P_I P_Q - R_{IQ}^2$. In step 1006, a square root module 622 takes the square root of $P_I P_Q - R_{IQ}^2$ to form a SQRT $(P_I P_Q - R_{IQ}^2)$ factor. In step 1008, a multiplier 624 multiplies SQRT $(P_I P_Q - R_{IQ}^2)$ factor by $1/P_I$ to form $1/P_I$ SQRT $(P_I P_Q - R_{IQ}^2)$. In step 1010, a reciprocal module 626 determines the reciprocal of $1/P_I \cdot$SQRT $(P_I P_Q - R_{IQ}^2)$ to produce $[1/P_I \cdot$SQRT $(P_I P_Q - R_{IQ}^2)]^{-1}$.

In step 410, the compensator module 601 compensates the (information baring) Q baseband signals 113 with the compensation factors $C_1$ and $C_2$. More specifically, multiplier 602 multiplies the I baseband signal 113a by $C_1$ to produce a $C_1 \cdot I$ signal 603. Adder 604 subtracts the $C_1 \cdot I$ signal 603 from the Q baseband signal 113b, to produce a Q baseband signal that is phase-compensated. Multiplier 606 multiplies the phase compensated Q baseband signal 113b by the amplitude compensation factor $C_2$, to produce the compensated Q baseband signal 114b that is both phase and amplitude compensated. Accordingly, the compensated I and Q baseband signals are corrected to remove phase and amplitude errors.

Figure 11:
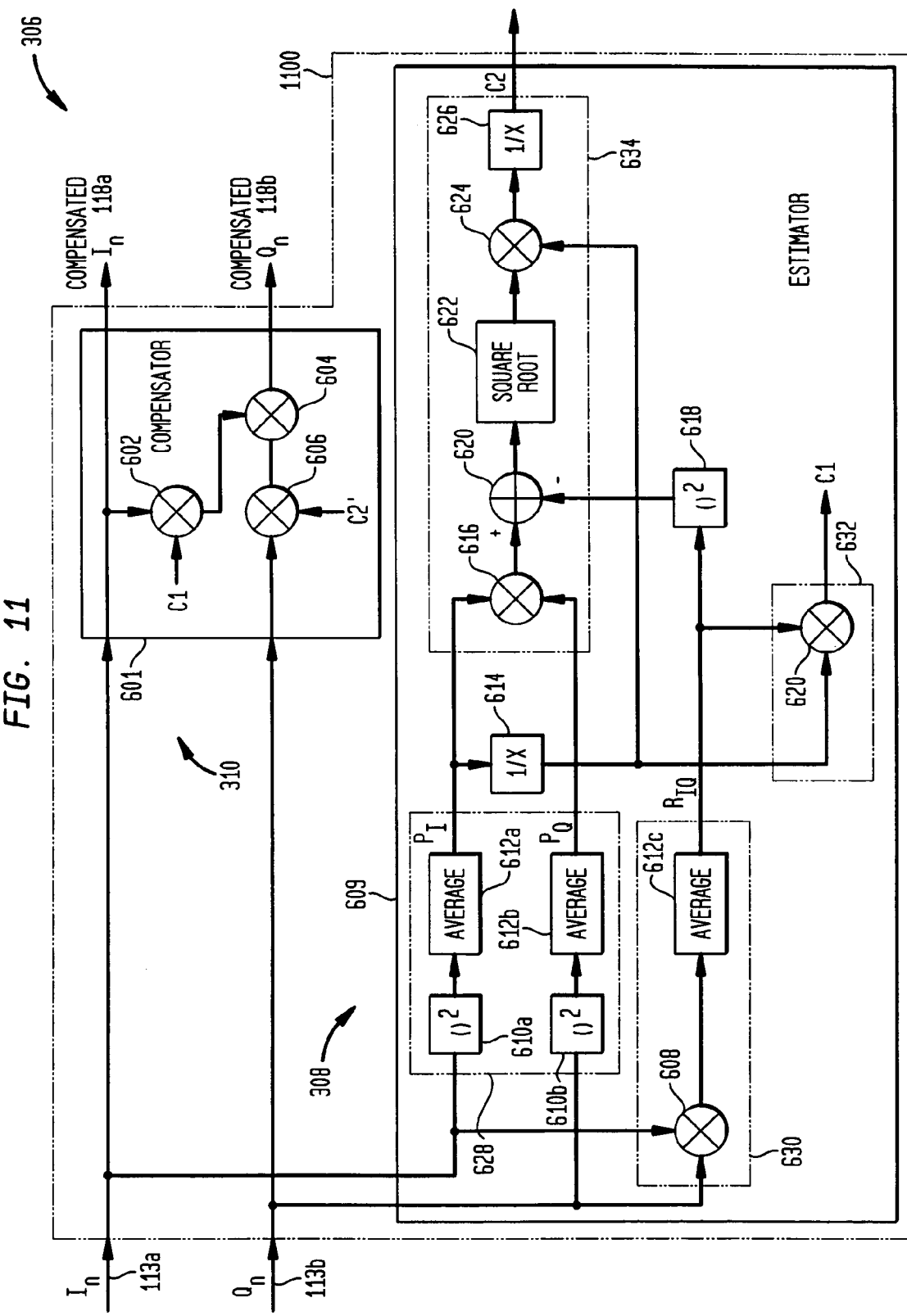
FIG. 11 illustrates an alternate configuration for the estimator/compensator module according to embodiments of the present invention.
Figure 12:
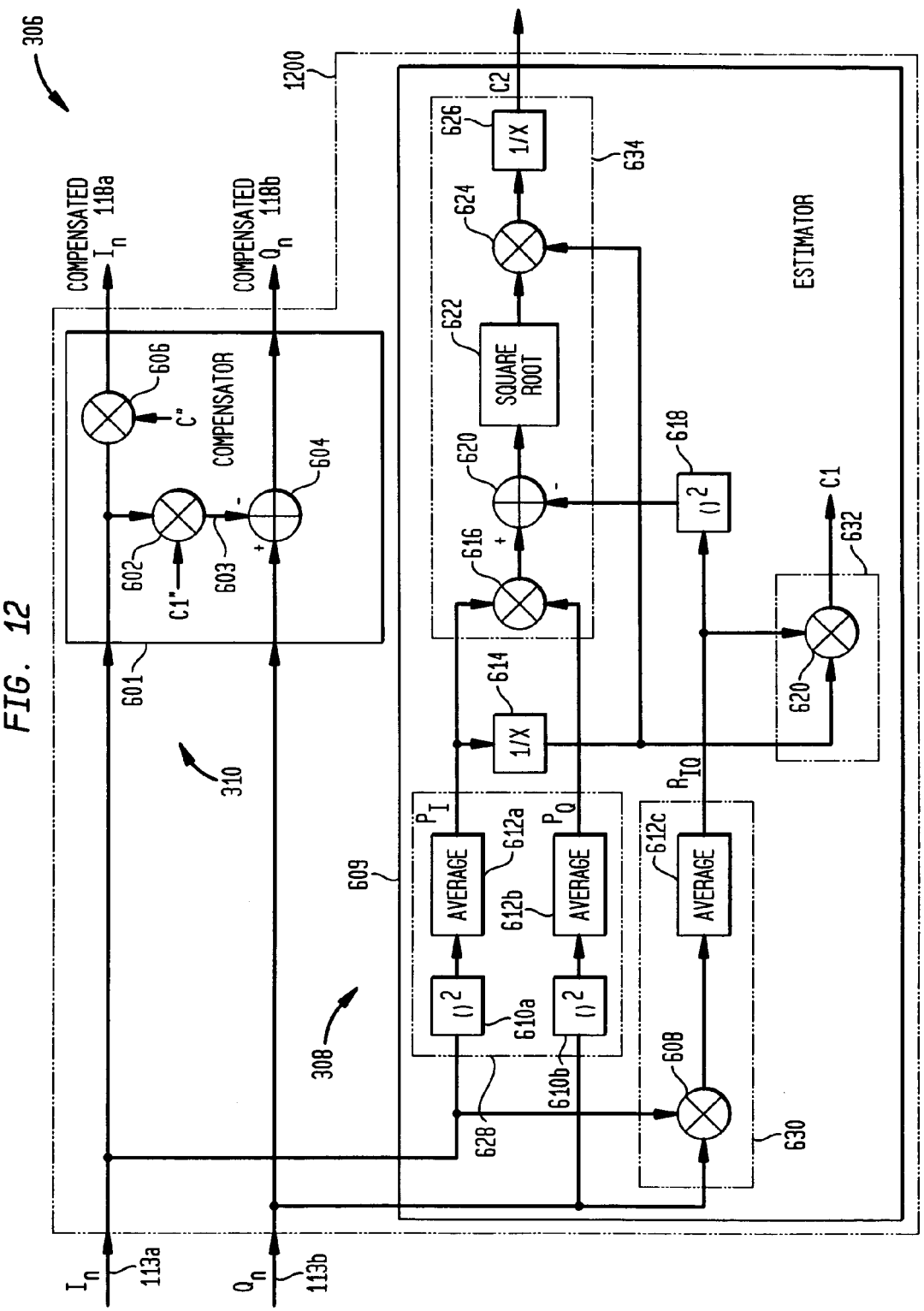
FIG. 12 illustrates an another alternate configuration for the estimator/compensator module according to embodiments of the present invention.

FIGS. 11 and 12 illustrate alternate embodiments of the estimator/compensator module 600. Namely, the FIG. 11 illustrates an estimator/compensator module 1100, where the order of the adder 604 and the multiplier 606 are reversed so that the multiplication is done first and the addition is done second, as shown. In this embodiment, $C_1$ and $C_2$ are replaced with $C_1'$, and $C_2'$, respectively, where:

$$C_1' = C_1 \cdot C_2 = \frac{R_{IQ}}{P_I} \left[ \frac{1}{P_I} \sqrt{P_I P_Q - R_{IQ}^2} \right]^{-1} \quad \text{Eq. 16A}$$

$$C_2' = C_2 = \left[ \frac{1}{P_I} \sqrt{P_I P_Q - R_{IQ}^2} \right]^{-1} \quad \text{Eq. 16B}$$

FIG. 12 illustrates an estimator/compensator module 1200, where the multiplier 606 is placed in the I channel. In this embodiment, $C_1$ and $C_2$ are replaced with $C_1''$ and $C_2''$, where:

$$C_1'' = \frac{1}{C_2} = \left[ \frac{1}{P_I} \sqrt{P_I P_Q - R_{IQ}^2} \right] \quad \text{Eq. 17A}$$

$$C_2'' = \frac{-C_1}{C_2} = \frac{-R_{IQ}}{P_I} \left[ \frac{1}{P_I} \sqrt{P_I P_Q - R_{IQ}^2} \right] \quad \text{Eq. 17B}$$

Other embodiments for the estimator/compensator module 600 may also realized by those skilled in the arts based on the discussion given herein. These other embodiments are within the scope and spirit of the present invention.

As discussed herein, the estimator/compensator module 600 can be efficiently implemented in a digital state machine. As such, in one embodiment, the estimator/compensator module 600 includes digital circuit components to implement the squarers, multipliers, and the signal averaging components that make-up the estimator/compensator module 600. This also holds for alternate embodiments 1100 and 1200.

Alternatively, the estimator/compensator module 600 can be implemented in a processor such as a digital signal processor, microprocessor, or another type of processor. In other words, the processor would perform the steps in the flowcharts 400, 500, and/or 700. In which case, the estimator/compensator module 600 can be combined with the digital signal processor 114 that further processes the I and Q baseband signals. As such, the operations and steps in the flowcharts 400, 500, and 700 can be described by computer program code that is operated in a processor. The computer program code can be stored on a computer useable medium as described further below.

Figure 8:
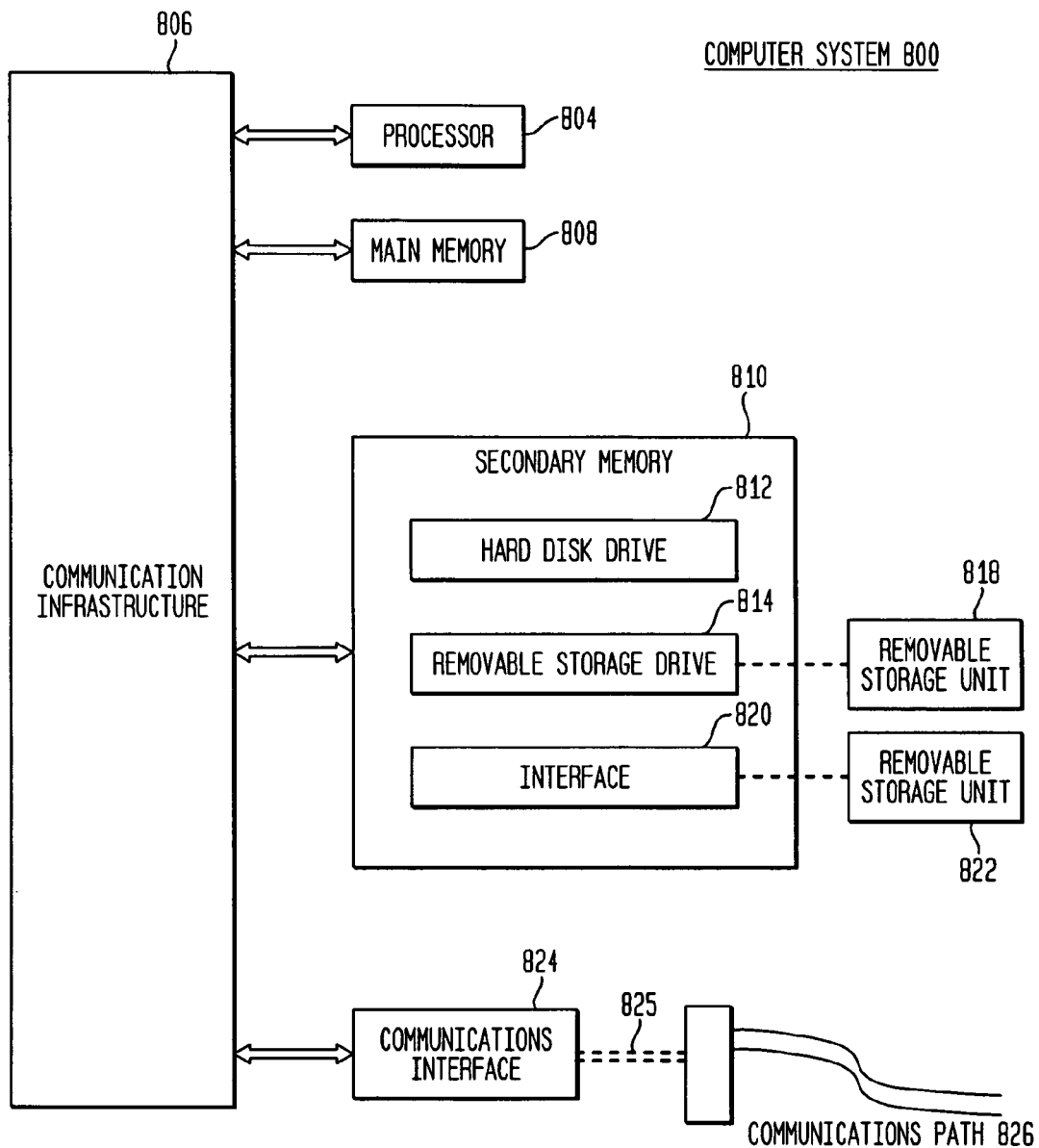
FIG. 8 illustrates an exemplary computer system capable of performing the estimation and compensation methods according to embodiments of the present invention.

For example, FIG. 8 illustrates an example computer system 800, in which the present invention can be implemented as computer-readable code. Various embodiments of the invention are described in terms of this example computer system 800. After reading this description, it will become apparent to a person skilled in the relevant art how to implement the invention using other computer systems and/or computer architectures.

The computer system 800 includes one or more processors, such as processor 804. Processor 804 can be a special purpose or a general purpose digital signal processor. The processor 804 is connected to a communication infrastructure 806 (for example, a bus or network). Various software implementations are described in terms of this exemplary computer system. After reading this description, it will become apparent to a person skilled in the relevant art how to implement the invention using other computer systems and/or computer architectures.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCM-CIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path 826. Communications path 826 carries signals 828 and may be implemented using wire or cable, fiber optics, a phone line, a cellular phone link, an RF link and other communications channels.

In this document, the terms "computer program medium" and "computer usable medium" are used to generally refer to media such as removable storage drive 814, a hard disk installed in hard disk drive 812, and signals 828. computer program medium and computer usable medium can also refer to memories, such as main memory 808 and secondary memory 810, that can be memory semiconductors (e.g. DRAMs, etc.) These computer program products are means for providing software to computer system 800.

Computer programs (also called computer control logic) are stored in main memory 808 and/or secondary memory 810. Computer programs may also be received via communications interface 824. Such computer programs, when executed, enable the computer system 800 to implement the present invention as discussed herein. In particular, the computer programs, when executed, enable the processor 804 to implement the processes of the present invention, such as the method(s) implemented using the oscillator structure 100 described above, such as method 300, for example. Accordingly, such computer programs represent controllers of the computer system 800. By way of example, in the embodiments of the invention, the processes performed by the signal processing blocks of oscillator 100 can be performed by computer control logic. Where the invention is implemented using software, the software may be stored in a computer program product and loaded into computer system 800 using removable storage drive 814, hard drive 812 or communications interface 824.

Figure 9A:
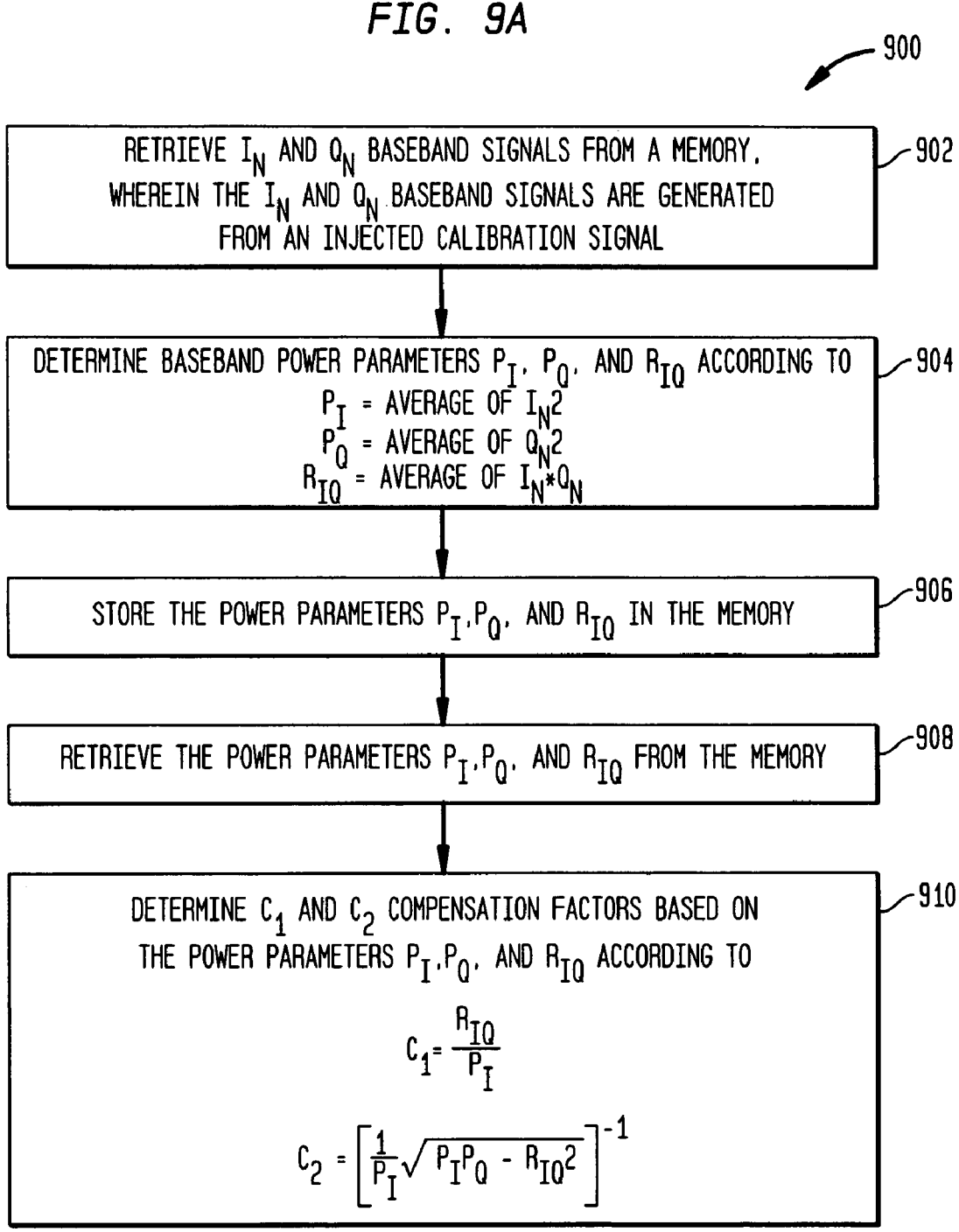
FIGS. 9a and 9b illustrate an operational flowchart for estimating IQ mismatch error using the exemplary computer system in FIG. 8.
Figure 9B:
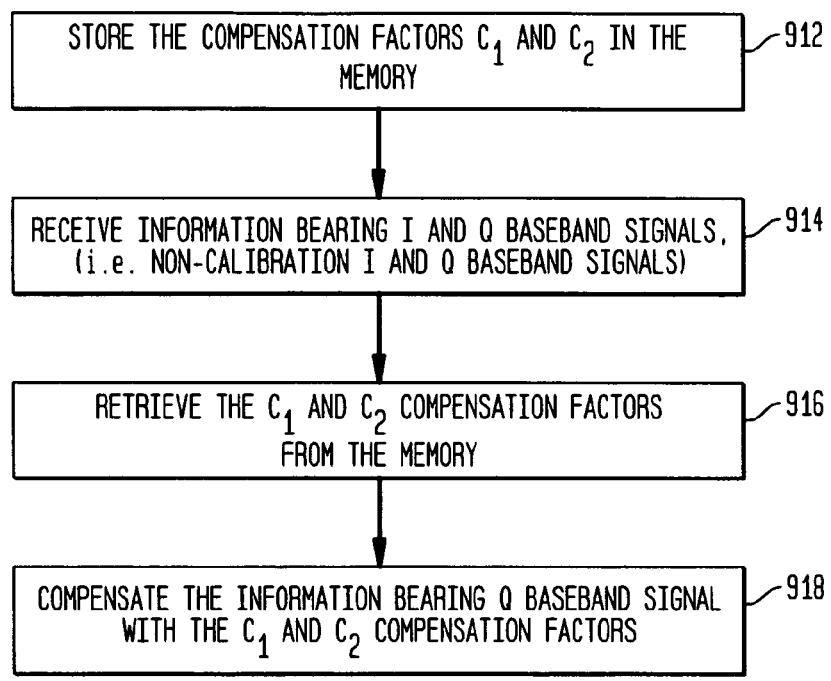

In a computer implementation, the operation of the compensator/estimator 600 can be further described to include steps for storing and accessing parameters in a memory. For instance, the $P_I$, $P_Q$, and $R_{IQ}$ parameters generated from the injected calibration signal can be stored in a memory. The memory can then be accessed to retrieve these parameters for determination of $C_1$ and $C_2$, which can also be stored in the memory. Flowchart 900 in FIG. 9, further describes the operation of the flowchart 700 in a computer implementation.

In step 902, a processor accesses and retrieves $I_N$ and $Q_N$ baseband signals from a first memory location. For example, the processor 804 could retrieve the $I_N$ and $Q_N$ baseband signals from a memory location in a main memory 808.

In step 904, the processor 804 determines baseband power parameters $P_I$, $P_Q$, and $R_{IQ}$ according to the following equations:

$$P_I = \text{Average of } I_N^2 \qquad \text{Eq. 1}$$

$$P_Q = \text{Average of } Q_N^2 \qquad \text{Eq. 2}$$

$$R_{IQ} = \text{Average of } I_N \cdot Q_N \qquad \text{Eq. 3}$$

In step 906, the processor 804 stores the power parameters $P_I$, $PQ_Q$ and $R_{IQ}$ in respective memory locations of the main memory 808.

In step 908, the processor 804 retrieves the power parameters $P_I$, $P_Q$, and $R_{IQ}$ from the main memory 808 for determination of the $C_1$ and $C_2$ compensation factors.

In step 910, the processor 804 determine the $C_1$ and $C_2$ compensation factors based on the power parameters $P_I$, $P_Q$, and $R_{IQ}$ according to the following equations:

$$C_1 = \frac{R_{IQ}}{P_I}; \qquad \text{Eq. 10}$$

$$C_2 = \left[\frac{1}{P_I}\sqrt{P_I P_Q - R_{IQ}^2}\right]^{-1}. \qquad \text{Eq. 15}$$

In step 912, the processor stores the $C_1$ and $C_2$ compensation factors in respective memory locations of the main memory 808.

In step 914, information bearing I and Q baseband signals are received. For example, referring back to FIG. 3, the switch 302 is configured so that the LNA 102 is connected to the antenna 116, instead of to the calibration signal source 304.

In step 916, the processor retrieves the $C_1$ and $C_2$ compensation factors from the respective memory locations of the main memory 808. In step 918, the processor 804 compensates the information bearing Q baseband signal with the $C_1$ and $C_2$ compensation factors, to produce compensated information bearing I and Q baseband signals. The compensated information bearing I and Q baseband signals are have reduced phase and amplitude errors.

5. Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. In an IQ receiver, a method of correcting mismatch errors between an I channel and a Q channel, the method comprising the steps of:
   injecting a calibration signal into an input of said IQ receiver, to produce an $I_N$ baseband signal and a $Q_N$ baseband signal at an output of said IQ receiver;
   determining an average power $P_I$ of said $I_N$ baseband signal, and an average power $P_Q$ of said $Q_N$ baseband signal;
   determining a cross-correlation $R_{IQ}$ between said $I_N$ baseband signal and said $Q_N$ baseband signal;
   determining a phase compensation factor $C_1$ based on said average power $P_I$ and said cross-correlation $R_{IQ}$, said phase compensation factor $C_1$ determined to compensate for any phase error between said $I_N$ baseband signal and said $Q_N$ baseband signal; and
   determining an amplitude compensation factor $C_2$ based on said average power $P_I$, said average power $P_Q$, and said cross-correlation $R_{IQ}$, wherein $C_2$ is determined to compensate for any amplitude error between said $I_N$ baseband signal and said $Q_N$ baseband signal.

2. The method of claim 1, wherein said phase compensation factor $C_1$ is determined according to the following,
$$C_1 = \frac{R_{IQ}}{P_I}.$$

3. The method of claim 1, wherein said amplitude compensation factor $C_2$ is determined according to the following,
$$C_2 = \left[\frac{1}{P_I}\sqrt{P_I P_Q - R_{IQ}^2}\right]^{-1}.$$

4. The method of claim 1, wherein said step of injecting includes the step of injecting a noise signal into an analog front-end of said IQ receiver.

5. The method of claim 1, wherein said step of injecting includes the step of disengaging said input of said IQ receiver from an information bearing signal source, and thereby said calibration signal is noise generated by said IQ receiver.

6. The method of claim 1, further comprising the step of compensating an information-bearing Q baseband signal with said phase compensation factor $C_1$ and said amplitude compensation factor $C_2$.

7. The method of claim 6, wherein said step of compensating includes the steps of:
   multiplying an information bearing I baseband signal by said compensation factor $C_1$ to produce a $C_1 \cdot I$ baseband signal;
   subtracting said $C_1 \cdot I$ baseband signal from said information bearing Q baseband signal to produce a phase-compensated Q baseband signal; and
   multiplying said phase-compensated Q baseband signal by said amplitude compensation factor $C_2$.

8. The method of claim 1, wherein said step of determining an average power $P_I$ of said $I_N$ baseband signal, and an average power $P_Q$ of said $Q_N$ baseband signal includes the steps of:
   squaring said $I_N$ baseband signal to produce a squared $I_N$ baseband signal;
   determining an average of said squared $I_N$ baseband signal to produce said average power $P_I$;
   squaring said $Q_N$ baseband signal to produce a squared $Q_N$ baseband signal; and
   determining an average of said squared $Q_N$ baseband signal to produce said average power $P_Q$.

9. The method of claim 8, wherein said step of determining a cross-correlation $R_{IQ}$ between said $I_N$ baseband signal and said $Q_N$ baseband signal includes the steps of:
   multiplying said $I_N$ baseband signal with said $Q_N$ baseband signal, to determine $I_N Q_N$; and
   averaging said $I_N Q_N$ to produce said cross-correlation factor $R_{IQ}$.

10. The method of claim 1, wherein said step of determining a phase compensation factor $C_1$ includes the steps of:
    determining a reciprocal of said average power $P_I$ to produce $1/P_I$; and
    multiplying $1/P_I$ with said cross-correlation $R_{IQ}$ to produce said phase compensation factor $C_1$.

11. The method of claim 1, wherein said step of determining an amplitude compensation factor $C_2$ includes the steps of:
    multiplying $P_I$ with $P_Q$ to determine $P_I P_Q$;
    determining a square of said cross-correlation $R_{IQ}$ to determine $R_{IQ}^2$;
    subtracting said $R_{IQ}^2$ from $P_I P_Q$ to produce $P_I P_Q - R_{IQ}^2$;
    determining a square root of $(P_I P_Q - R_{IQ}^2)$;
    multiplying said square root of $(P_I P_Q - R_{IQ}^2)$ by a reciprocal of $1/P_I$ to produce $1/P_I \cdot \text{SQRT}(P_I P_Q - R_{IQ}^2)$; and
    determining reciprocal of $1/P_I \cdot \text{SQRT}(P_I P_Q - R_{IQ}^2)$.

12. An apparatus for correcting mismatch between an I channel path and a Q channel path of an IQ receiver based on a calibration input signal, said I channel path and said Q channel path outputting an $I_N$ baseband signal and a $Q_N$ baseband signal responsive to said calibration input signal, said apparatus comprising:
    a compensator module coupled to an output of said I channel path and an output of said Q channel path, said compensator module configured to compensate said output of said Q channel path with a phase compensation factor $C_1$ and an amplitude compensation factor $C_2$;
    an estimator module configured to generate said phase compensation factor $C_1$ and said amplitude compensation factor $C_2$ responsive to said $I_N$ baseband signal and said $Q_N$ baseband signal,
    wherein said phase compensation factor $C_1$ is determined according to,
$$C_1 = \frac{R_{IQ}}{P_I};$$
    wherein said amplitude compensation factor $C_2$ is determined according to, $$C_2 = \left[\frac{1}{P_I}\sqrt{P_I P_Q - R_{IQ}^2}\right]^{-1};$$

wherein,
$P_I$ is an average power of said $I_N$ baseband signal,
$P_Q$ is an average power of said $Q_N$ baseband signal, and
$R_{IQ}$ is a cross-correlation between said $I_N$ baseband signal and said $Q_N$ baseband signal.

13. The apparatus of claim 12, wherein said compensator module includes:
a first digital multiplier configured to multiply said output of said I channel path by said phase compensation factor $C_1$;
a digital subtractor configured to subtract an output of said first digital multiplier from an output of said Q channel path; and
a second digital multiplier configured to multiply an output of said digital subtractor with said amplitude compensation factor $C_2$.

14. The apparatus of claim 12, wherein said estimator module includes:
a power detector module configured to determine an average power $P_I$ of said $I_N$ baseband signal and an average power $P_Q$ of said $Q_N$ baseband signal;
a cross-correlation module configured to determine a cross-correlation between said $I_N$ baseband signal and said $Q_N$ baseband signal;
a phase compensation module configured to determine said phase compensation factor $C_1$ based on said average power $P_I$ and said cross-correlation factor $R_{IQ}$; and
an amplitude compensator module configured to determine said amplitude compensation factor $C_2$ based on said average power $P_I$, said average power $P_Q$, and said cross-correlation factor $R_{IQ}$.

15. The apparatus of claim 14, wherein said cross-correlation module includes a digital multiplier configured to multiply said $I_N$ baseband signal with said $Q_N$ baseband signal.

16. The apparatus of claim 14, wherein said phase compensator module includes a digital multiplier configured to multiply said cross-correlation factor $R_{IQ}$ with a reciprocal of said average power $P_I$.

17. The apparatus of claim 14, wherein said amplitude compensation module includes:
a first digital multiplier configured to multiply said average power $P_I$ with said average power $P_Q$;
a digital subtractor configured to subtract a square of said cross-correlation $R_{IQ}$ from an output of said first digital multiplier;
means for determining a square root of an output of said digital substracter;
a second digital multiplier for multiplying an output of said means for determining a square root with a reciprocal of said average power $P_I$.

18. An IQ receiver, comprising:
a receiver input;
a local oscillator;
means for generating a calibration signal that is coupled to said receiver input;
an I channel path, coupled to said receiver input, said I channel path having a first mixer coupled to said local oscillator and a second input coupled to said receiver input, and a first analog-to-digital converter coupled to an output of said first mixer, said analog-to-digital converter generating an $I_N$ baseband signal responsive to said calibration signal;
a Q channel path, coupled to said receiver input, said Q channel path having a second mixer coupled to said local oscillator and a second input coupled to said receiver input, and a second analog-to-digital converter coupled to an output of said second mixer, said analog-to-digital converter generating an $Q_N$ baseband signal responsive to said calibration signal;
a compensator module coupled to an output of said I channel path and an output of said Q channel path, said compensator module configured to compensate said output of said Q channel path with a phase compensation factor $C_1$ and an amplitude compensation factor $C_2$;
an estimator module configured to generate said phase compensation factor $C_1$ and said amplitude compensation factor $C_2$ responsive to said $I_N$ baseband signal and a $Q_N$ baseband signal,
wherein said phase compensation factor $C_1$ is determined according to, $$C_1 = \frac{R_{IQ}}{P_I};$$

wherein said amplitude compensation factor $C_2$ is determined according to, $$C_2 = \left[\frac{1}{P_I}\sqrt{P_I P_Q - R_{IQ}^2}\right]^{-1};$$

wherein,
$P_I$ is an average power of said $I_N$ baseband signal,
$P_Q$ is an average power of said $Q_N$ baseband signal, and
$R_{IQ}$ is a cross-correlation between said $I_N$ baseband signal and said $Q_N$ baseband signal.

19. The method of claim 1, wherein said phase compensation factor $C_1$ is determined according to:

$$C_1 = \frac{R_{IQ}}{P_I}\left[\frac{1}{P_I}\sqrt{P_I P_Q - R_{IQ}^2}\right]^{-1}.$$

20. The method of claim 1, wherein said phase compensation factor $C_1$ is determined according to:

$$C_2 = \left[\frac{1}{P_I}\sqrt{P_I P_Q - R_{IQ}^2}\right].$$

21. The method of claim 20, wherein said amplitude compensation factor $C_2$ is determined according to:

$$C_2 = \frac{-R_{IQ}}{P_I}\left[\frac{1}{P_I}\sqrt{P_I P_Q - R_{IQ}^2}\right].$$

* * * * *

UNITED STATES PATENT AND TRADEMARK OFFICE
CERTIFICATE OF CORRECTION

PATENT NO. : 7,020,220 B2
DATED : March 28, 2006
INVENTOR(S) : Christopher James Hansen It is certified that error appears in the above-identified patent and that said Letters Patent is hereby corrected as shown below:

Column 16,

Line 55, " $C_2 = \left[ \dfrac{1}{P_I} \sqrt{P_I P_Q - R_{IQ}^2} \right]$ " should read -- $C_1 = \left[ \dfrac{1}{P_I} \sqrt{P_I P_Q - R_{IQ}^2} \right]$ --.

Signed and Sealed this

Thirteenth Day of June, 2006

JON W. DUDAS
*Director of the United States Patent and Trademark Office*